United States Patent [19] | [11] Patent Number: 5,033,780
Wootten | [45] Date of Patent: Jul. 23, 1991

[54] DISPOSABLE CONTAINER FOR SOLID ANIMAL WASTES

[76] Inventor: Ruth M. Wootten, P.O. Box 643, Coronado, Calif. 92118

[21] Appl. No.: 618,574

[22] Filed: Nov. 27, 1990

Related U.S. Application Data

[63] Continuation of Ser. No. 297,301, Jan. 13, 1989, abandoned.

[51] Int. Cl.[5] ........................ A01K 29/00; E01H 1/12

[52] U.S. Cl. .................................. 294/1.3; 15/104.8; 15/257.6; 383/34

[58] Field of Search ........................ 294/1.1, 1.3-1.5, 294/55; 15/104.8, 257.1, 257.2, 257.6, 257.7, 257.9; 206/223, 496; 248/95, 99; 383/33, 34, 34.1, 85

[56] References Cited

U.S. PATENT DOCUMENTS

| | | | |
|---|---|---|---|
| D. 262,943 | 2/1982 | Schädler | 294/1.3 X |
| 1,049,821 | 1/1913 | Devini | 383/34 X |
| 2,216,133 | 10/1940 | Potdevin et al. | 383/85 X |
| 2,900,156 | 8/1959 | Styers | 248/99 |
| 3,589,595 | 6/1971 | White | 383/33 X |
| 3,830,423 | 8/1974 | Prescott | 294/1.3 |
| 4,103,952 | 8/1978 | Thompson | 294/1.3 |
| 4,138,153 | 2/1979 | Brown | 294/1.3 X |
| 4,205,869 | 6/1980 | Mathis | 294/1.3 |
| 4,230,354 | 10/1980 | Claras | 294/1.3 |
| 4,252,356 | 2/1981 | Tokuzumi | 294/1.3 |
| 4,458,932 | 7/1984 | Resch | 294/1.3 |
| 4,483,560 | 11/1984 | Lordi | 294/1.3 |

FOREIGN PATENT DOCUMENTS

| | | | |
|---|---|---|---|
| 637845 | 4/1962 | Italy | 383/34 |
| 980320 | 1/1965 | United Kingdom | 383/34 |
| 1150742 | 4/1969 | United Kingdom | 383/34 |

*Primary Examiner*—Johnny D. Cherry
*Attorney, Agent, or Firm*—Knobbe, Martens, Olson & Bear

[57] ABSTRACT

A disposable container for solid animal waste products comprising a waterproof flexible bag, a locking support structure, a closure strip, and a removable spatula. The support structure has a locking mechanism consisting of a center stay located opposite a pair of hinged support arms that maintain the bag mouth in an open configuration when the bag is in use. The locking support structure provides for accurate placement of solid animal waste into the bag during use, and the convenient collapsibility after use. The disposable container is economical to manufacture, and is also disposable, portable, sanitary, collapsible, and sealable. The disposable container also may be reopened several consecutive times without destroying the integrity of the locking support structure.

12 Claims, 1 Drawing Sheet

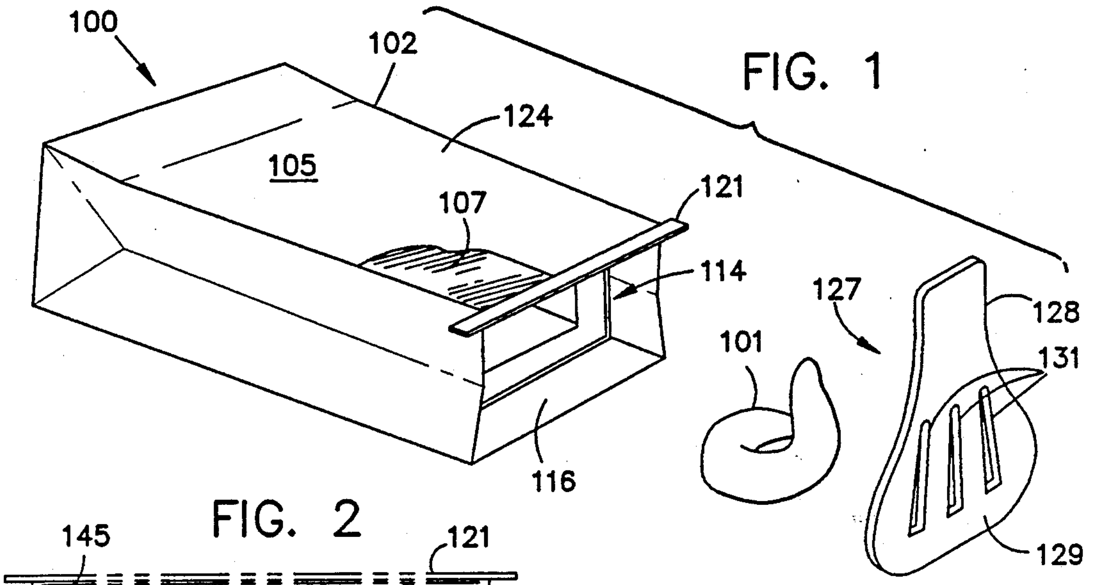
FIG. 1
FIG. 2
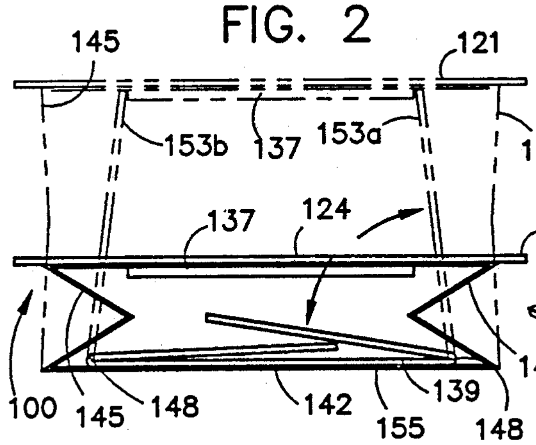
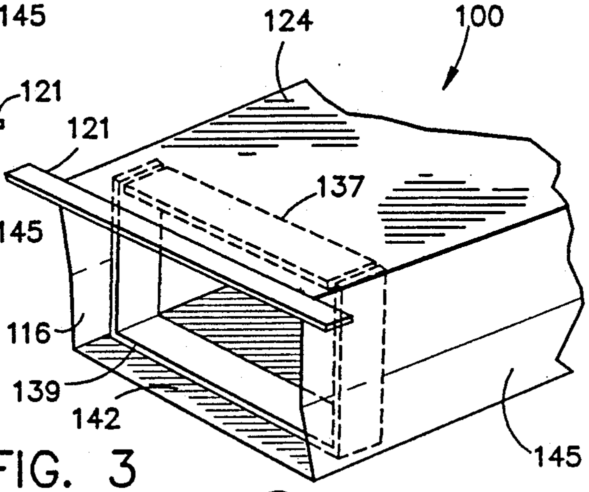
FIG. 3
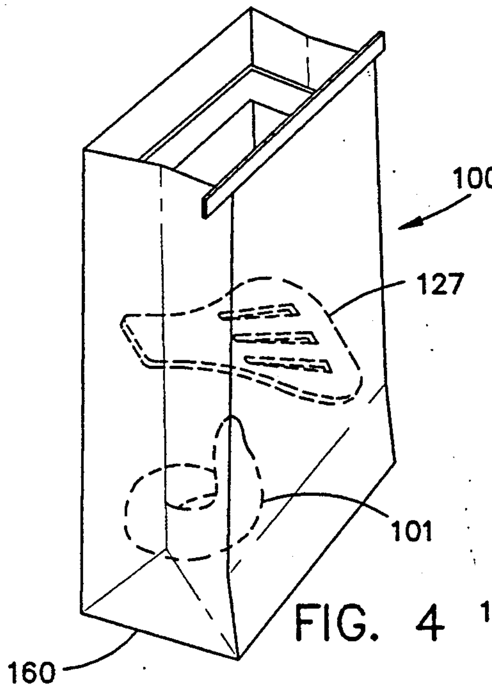
FIG. 4
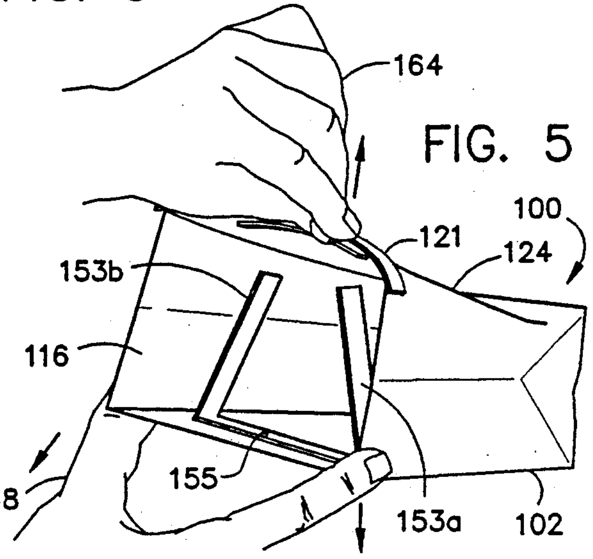
FIG. 5

DISPOSABLE CONTAINER FOR SOLID ANIMAL WASTES

This application is a continuation of application Ser. No. 07/297,301, filed Jan. 13, 1989, now abandoned.

BACKGROUND OF THE INVENTION

1. Field of the Invention

The present invention generally relates to a disposable container for the removal and/or temporary storage of solid animal wastes and more particularly, to such a container having a selectively closable, reinforced opening and an accompanying spatula for easy clean-up of solid waste materials left by pet animals.

2. Description of the Prior Art

The ever increasing suburban population, the social alienation of city and suburban life, when combined with far greater numbers of singles and senior citizens, has created a pet population boom. More people than ever before are turning to pets—particularly dogs and cats—for companionship and as a source for peace of mind/security. Unfortunately, dogs and cats have entirely different behavior traits, and the convenience of a cat litter box has no parallel with dogs. Euphemisms abound, from "walking the dog" to "letting the dog out". However, what in fact frequently happens, is the pet owner thoughtlessly shifts his or her pet waste disposal problem to an innocent third party or to an entire municipality. At the most trivial of levels, society is collectively required to take a more careful walk through the park, along city streets, or across a lawn.

Pet wastes are not just disgusting, they can also serve as a reservoir or a vector for a number of diseases. For the unwary, such wastes also provide a possible basis for a slip-and-fall accident. In response to growing public indignation, most large municipalities and suburban communities have enacted or are enacting statutes to require pet owners to remove offending material left behind by pet animals in city parks, along streets, and on walkways. A sense of common decency about such matters apparently no longer exists, and prior to these laws, the public grounds and thoroughfares were rapidly becoming unusable for pedestrian traffic.

Such pet waste laws will typically require the owner of a dog to pick up and properly dispose of any and all solid wastes generated by his or her pet. The owner must come prepared with (1) an implement to retrieve the solid wastes and (2) a portable receptacle or containment device for storing the wastes until removal can be effected to a suitable refuse container.

One alternative, a shovel and bucket, has been used by many owners. This solution, while more fashionable than the homespun plastic bag/soup spoon method of retrieval, is cumbersome, and except for the largest of pets, gives the appearance of overkill. The clean-up device should preferably be a compact, disposable container that includes some type of mechanism or procedure for placing the waste products in the container. These requirements have been addressed in a number of different ways in the past.

The inconveniences of walking a pet while carrying both a shovel and a waste container were recognized by both Tokuzumi, (U.S. Pat. No. 4,252,356), and Thompson, (U.S. Pat. No. 4,103,952). Along with Claras, (U.S. Pat. No. 4,230,354), each address this problem by offering inexpensively produced portable waste bags. Designed to be disposable, all provide a bag and a spatula or scraper to push the solid waste materials into the bag.

The nature of these waste materials makes it desirable to accurately place the wastes inside of the bag and to then securely retain the wastes therein. The manner by which these design criteria have been addressed varies somewhat. Claras makes use of a semi-rigid reinforcing band about the mouth of the bag, with a gripping tab formed in this band to hold open the bag. Thompson likewise provides a reinforced "upper portion", which is manipulated and held open by the user, with a pair of finger holes assisting in this regard. After the waste products have been received within the bag, a strip of adhesive secures the bag opening. Tokuzumi uses a ribbon to direct the opening and positioning of the bag mouth; the ribbon also cooperates with a multi-use scooper board to clamp the ends of the bag together after placement of the wastes inside. Although not specifically designed for pet wastes, Styers (U.S. Pat. No. 2,900,156) and Potdevin, et al., (U.S. Pat. No. 2,216,133), illustrate the use of metal tie strips for securing closed paper bags.

Brandon, (United Kingdom Patent No. 1,150,742), discloses several different types of reinforcing frameworks designed to keep a disposable paper waste container in an open position. Such frameworks include a triangularly-shaped reinforcing framework (FIG. 1) and a rectangular frame constructed by inserting the tips of two hinged arms into slits formed in the opposing bag wall (FIG. 3). Also shown is a continuous rectangular reinforcing frame that is provided with creases or fold lines to permit collapse of the strips when the bag is full (FIG. 4).

The foregoing bag reinforcement structures are attempting to address two conflicting design criteria: 1) maintain the bag opening in its maximum open position; and 2) permit rapid bag closure when appropriate for sealing and bag disposal. Additionally, from an aesthetic perspective, it is also desireable to minimize the manipulations required, particularly those adjacent the bag mouth, to effect closure after the waste material has been placed within the bag. The gripping tabs or finger holes of the Claras and the Thompson structures increase both the amount and the complexity of the manipulations required to load the bags, and the various supporting structures proposed by Brandon either limit the opening size or increase the complexity of the closure operation.

Consequently, a need exists for a disposable container for solid animal wastes that is economical to manufacture, and that is also reinforced about the bag opening in a manner that will maintain the bag mouth in a fully opened configuration while loading the bag, yet will also permit the prompt collapse and sealing of the bag for transport and disposal.

SUMMARY OF THE INVENTION

The present invention provides a disposable container for solid animal wastes designed to satisfy the aforementioned needs. The subject container, in the preferred embodiment, is a waterproof bag with a paper covered tie strip affixed thereto and a display board strip mouth support. A disposable spatula is enclosed in the bag.

In the preferred embodiment, the present flexible waste container consists of two plies, a conventional outer folded bag of kraft paper and an inner glassine bag. Attached to the outer ply, adjacent the bag opening or mouth, is a closure strip, or tie, with an internal metal strip provided to stiffen an outer paper strip. Inside the bag, near the mouth, is a temporary locking support structure consisting of two separate strips of a water-resistant cardboard or similar material located on opposite inner walls. Two arms extend from one of the strips, cooperatively engaging with the opposite strip to form an internal reinforcing framework, which can be used to maintain the mouth of the bag in a maximal open position. The subject invention permits these arms to be readily disengaged, thus enabling convenient collapse and closure of the bag. The spatula, having one end wider than the other, is placed loosely in the bag. Preferably, a plurality of substantially parallel longitudinal slots are cut into the wide end of the spatula, which can be formed out of the same water-resistant material as the locking support structure.

When the need arises, the user of the present invention fully opens the bag and props open the mouth of the bag by swinging out the hinged arms to a position perpendicular to the opposing display board strip. Thus, the bag shape is expanded from a collapsed configuration to an open configuration. The bag is then placed proximate to the offending animal wastes and the enclosed spatula is used to push the solid wastes into the bag. After use, the dirtied spatula is replaced into the bag, which is then ready to be collapsed. At the next step, the two opposing sidewalls being propped open are gently pulled apart, widening the mouth and thus permitting the hinged arms to collapse away from the display board strip and back to their initial, folded position. The bag opening may then be closed, and the top edge or end of the bag folded over twice, thus sealing the bag. Additional security may be obtained by bending the flexible tie ends around the folded end of the bag.

These and other objects and features of the present invention will become more fully apparent from the following description and appended claims taken in conjunction with the accompanying drawings.

BRIEF DESCRIPTION OF THE DRAWINGS

FIG. 1 is a perspective view with portions broken away of a disposable container open and ready to receive solid animal waste being scooped by a spatula.

FIG. 2 is a front elevation view of a generally collapsed disposable container with the open configuration of the container shown in phantom.

FIG. 3 is a partial perspective view of a container in its open configuration with portions shown in phantom.

FIG. 4 is a perspective view of a disposable container containing solid animal waste and a spatula, with portions shown in phantom.

FIG. 5 is a perspective view of a disposable container shown in the process of being converted from an open configuration to a collapsed configuration.

DESCRIPTION OF THE PREFERRED EMBODIMENT

Turning now to the figures, FIG. 1 shows the preferred embodiment of a disposable container 100 on its side, as if placed on the ground. The container is useful as a temporary storage receptacle to dispose of a solid animal waste product 101 left behind by pets (not shown). The principal element of the disposable container 100 is a waterproof flexible bag 102. The flexible bag 102 is preferably constructed of two-plies, an outer ply of kraft paper 105 and an inner ply of glassine, plastic, or other like waterproof material 107. In a preferred embodiment, the flexible bag 102 is a coffee bag, such as Model No. C1 supplied by Atlantic Bedford Paper Co., Inc., of Hialeah, Fla.

A locking support structure 114 is affixed, in a preferred embodiment, with double-sided adhesive strips, (such as a ½" wide adhesive transfer tape supplied by A. E. Yale Enterprises of San Diego, Calif.), to the inner walls of the bag 102 near a bag mouth 116. The locking support structure 114 can be fabricated from a water-resistant cardboard such as, for example, a product n termed "display board", of 0.050" thickness, supplied by Unisource of National City, Calif. The locking support structure 114 provides the disposable container 100 with two configurations: (1) an open configuration (as shown in FIG. 1); and (2) a collapsed configuration. When in the open configuration, the support structure 114 is employed to prop open and maintain the bag mouth 116 in a maximal open position.

A closure strip 121 is shown affixed to a sidewall 124 of the flexible bag 102, proximate to the bag mouth 116. The closure strip 121 is preferably of a conventional design, using a metal wire or strip with an outer kraft paper covering. In general, an adhesive is used to affix the closure strip 121 to the bag sidewall 124. Many manufacturers, such as Atlantic Bedford Paper Co., Inc., of Hialeah, Fla., provide flexible bags with a closure strip already attached. The closure strip 121 enables the bag mouth 116 to be secured in the collapsed configuration after use.

To assist in the placement of the solid waste product 101 within the disposable container 100, a spatula 127 may be provided. The flask-shaped design shown in FIG. 1, consisting of a handle portion 128 and a blade 129, may be advantageously employed in this regard. The spatula 127 is preferably enclosed in the disposable container 100 when sold, and can be manufactured from a stiff piece of display board, for example, display board of 0.070" thickness supplied by Unisource of National City, Calif. A plurality of vertical slots 131 are preferably cut in the blade 129 of the spatula 127. The vertical slots 131 give the spatula 127 a varying frictional surface, so that firm contact can be made between the animal waste product 101 and the blade 129 of the spatula 127. Thus, to move the solid animal waste product 101 into the disposable container 100, a human hand (not shown) grasps the spatula 127 by the handle portion 128 and places the blade 129 adjacent to the waste product 101. The spatula 127 is used to push the waste product 101 into the disposable container 100, through the open bag mouth 116.

As is best shown in FIG. 2, the locking support structure 114 consists of a center stay 137, affixed to the inner wall of the bag sidewall 124, and a hinged strip 139 that is bonded to an inner, bottom sidewall 142, and that is located opposite and parallel to the center stay 137. The length of the hinged strip 139 is preferably the approximate summation of the following measurements: the width of the bottom sidewall 142, as measured between a pair of gusseted sidewalls 145 at the bag mouth 116, and the combined length of both of the gusseted sidewalls 145, as measured between the bag sidewall 124 and the inner, bottom sidewall 142, at the bag mouth 116. The hinged strip 139 has a pair of hinges 148, formed at opposite ends thereof, with the hinges 148 creating a pair of support arms 153*a*, 153*b*, at opposite ends of a center strip 155. Only the center strip 155 portion is adhered to the inner, bottom sidewall 142.

The twin support arms 153*a,* 153*b* remain free to pivot outwardly at the hinges 148.

The hinges 148 in the preferred embodiment consist of creases formed in the hinged strip 139, and may be manufactured by selectively scoring the hinged strip 139 thereby weakening the rigidity of the hinged strip 139 at the required locations. In order to provide their support function, the hinges 148 should be formed in the hinged strip 139 at locations selected to provide a length of the support arms 153*a,* 153*b* equal to approximately the dimension of the expanded gusseted sidewall 145.

In FIG. 2, the container 100 is shown in a generally collapsed configuration. In the fully collapsed configuration the bag mouth 116 is completely closed, and the disposable container 100 lies flat for easy storage and transport. Further size reduction, to a pocket-sized product (not shown), is possible by placing the spatula 127 at the bottom of the bag and folding the container 100 about this bottom or base area.

The phantom lines in FIG. 2 illustrate the bag mouth 116 when the disposable container 100 is in the fully open configuration. In this configuration, the gusseted sidewalls 145 are extended, straightening the creases. Additionally, the support arms 153*a,* 153*b* are locked in place, abutting a support arm receiving surface at opposing lateral ends of the center stay 137 and an adjacent portion of the sidewall 124, while remaining roughly perpendicular, but at slightly acute angles to the center strip 155. The orientation of the support arms 153*a,* 153*b* with respect to the center strip 155 is advantageously made by properly sizing the center stay 137 to a dimension less than the width of the bag sidewall 124 (FIG. 1) and positioning the center stay 137 so as to define spaces between the ends of the center stay 137 and the gusseted sidewalls 145. This configuration of the locking support structure 114, best shown in FIG. 3, locking the bag mouth 116 open, allows accurate placement of the solid animal waste product 101 (FIG. 1) in the disposable container 100. Without the locking support structure 114, the bag mouth 116 would have to be held open by other means, such as by the user's own hands. Besides its use as a support arm brace, the center stay 137 also reinforces the bag mouth 116, such that the disposable container 100 can be held by a single sidewall, thus preventing the disposable container 100 from slipping backwards while being filled. Additionally, since the disposable container 100 is constructed out of a pliant material, the reinforcement provided by the center stay 137 tends to prevent the bag mouth 116 from yielding, and thereby releasing the support arms 153*a,* 153*b*. Hence, the process of filling the disposable container 100 would be made considerably more difficult—absent the reinforcement offered by the center stay 137.

After the disposable container 100 is filled with the solid animal waste product 101, as is shown in FIG. 4, the disposable container 100 may be tipped up on a bag base 160. Once the disposable container 100 holds the solid animal waste product 101, the dirtied spatula 127 may be deposited therein. At this point, as is illustrated in FIG. 5, the disposable container 100 is gripped between a first and second hand 164, 168 of a user and the mouth opening 116 is stretched further apart. This separation action disengages the locking support structure 114, i.e., the support arms 153*a,* 153*b* and the center stay 137, permitting the support arms 153*a,* 153*b* to fold downwardly about the pair of hinges 148. The disposable container 100 is then permitted to adopt its collapsed configuration, (shown generally in FIG. 2). The disposable container 100 is sealed to secure the contents and to contain the odors within the bag, by rolling over the bag mouth 116 twice, or so, and then bending the ends of the closure strip 121 around the rolled bag mouth 116 in a conventional manner. To assist in this folding process, the flexible bag 102 may be provided with a pleated or pre-folded area adjacent the bag mouth 116 (not shown), and the width of the closure strip 121 is of a suitable dimension such that the significantly more rigid locking support structure 114 will not interfere with the folding process. For example, the locking support structure 114 can be recessed approximately 1 inch from the bag mouth 116 and the closure strip 121 of width ¼ inch. With such dimensions, the rolled and sealed container 100 is 1 inch shorter in length and the locking support structure 114 provides additional reinforcement to the seal. The user may then proceed on his or her way, and deposit the used disposable container 100 in a garbage receptacle (not shown) at the earliest convenient time.

Alternatively, the disposable container 100 may be reused prior to disposal. For example, a pet owner may want to use the disposable container 100 several times during the course of a day, while his or her dog frolics in the yard. As another example of reuse, during the course of a backyard cleanup, the disposable container may be kept outside the house over a three to four day period. The preferred construction materials for the disposable container 100 are such that natural ground and air dampness, short of actual rain, even over several nights, does not cause sufficient deteriorization in the bag materials as to interfere with the quality or usefulness of the bag.

While the above detailed description has shown, described, and pointed out the fundamental novel features of the invention as applied to an embodiment, it will be understood that various omissions and substitutes and changes in the form and details of the device illustrated may be made by those skilled in the art, without departing from the spirit of the invention.

What is claimed is:

1. A disposable container for solid animal wastes having a maximal open position during use, and which easily collapses after use, comprising:

a flexible bag having a plurality of bag sidewalls and a bag mouth; and a locking support structure to selectively maintain said mouth of said bag in a maximal open position during use and readily collapse said mouth to a closed position thereafter comprising:

a center stay affixed to a first bag sidewall near said bag mouth and between a second and a third bag sidewall located adjacent thereto, said center stay being of such longitudinal dimension and position as to define a pair of spaces between ends of said center stay and said second and third bag sidewalls; and a hinged linear strip affixed to a fourth bag sidewall opposite said center stay, said hinged strip comprising a center linear strip spanning said fourth bag sidewall, and a pair of hinged linear arms attached to said center linear strip, which in a collapsed configuration for said flexible bag fold to overlap the top surface of said center linear strip and when extended, each of said pair of hinged arms extends at an angle less than perpendicular from said center strip to span said second and third bag sidewalls in a manner such that each of said hinged arms rests against and is retained by surface contact with a corresponding lateral end of said center stay and an adjacent portion of said first bag sidewall.

2. A disposable container for solid animal wastes as recited in claim 1 additionally comprising:

a closure strip affixed to one of said bag sidewalls.

3. A disposable container for solid animal wastes as recited in claim 1 additionally comprising:

a removable spatula placed within said flexible bag, said spatula having a wide end and a narrow end.

4. A disposable container for solid animal wastes as recited in claim 1, wherein said flexible bag is a two-ply bag having an outer ply of kraft paper and an inner ply of glassine.

5. A disposable container for solid animal wastes as recited in claim 1, wherein said flexible bag is a two-ply bag having an outer ply of kraft paper and an inner ply of plastic, whereby said flexible bag forms a waterproof container.

6. A disposable container for solid animal wastes as recited in claim 1, wherein said locking support structure is manufactured from display board.

7. A disposable container for solid animal wastes as recited in claim 1 additionally comprising:

a closure strip of kraft paper enclosing a metal strip.

8. A disposable container for solid animal wastes as recited in claim 1 additionally comprising:

a removable flat display board spatula placed within said disposable container, and having a wide end and a narrow end, said wide end having a plurality of longitudinal slots formed therein.

9. A disposable container having a releasable bag-mouth locking mechanism, said disposable container comprising:

a flexible storage bag;

a first linear member attached to a first interior surface adjacent a mouth of said flexible storage bag;

a second linear member attached to a second interior surface of said flexible storage bag, said second interior surface disposed opposite of said first interior surface and said second linear member disposed opposite said first linear member; and a pair of linear support arms attached to said first linear member in a manner providing a first angular position between each of said pair of linear support arms and said first linear member, said first angular position being acute from perpendicular with respect to said first linear member, and a second angular position between each of said pair of linear support arms and said first linear member, wherein each said linear support arm has a tip, said pair of linear support arms selectively extending to and interengageable with a support arm receiving surface at each lateral end of said second linear member, and each tip abuttingly contacting said second interior surface at said first angular position, and said pair of linear support arms overlapping and located substantially parallel to said first linear member at said second angular position, whereby the maintenance of the bag mouth in a maximal open position may be readily accomplished by extending the support arms to their selective interengagement with the opposing, second linear member in said first angular position and the bag mouth is readily collapsed thereafter by slidably positioning the support arms in said second angular position.

10. A disposable container having a releasable locking mechanism as described in claim 9, wherein said first linear member comprises a linear central segment to which said pair of linear support arms are attached and said second linear member comprises a center stay.

11. A disposable container having a releasable locking mechanism as described in claim 10, wherein the attachment of each of said pair of linear support arms to said linear central segment of said first linear member forms a hinged connection.

12. An improved disposable waste container of the type consisting of a flexible bag having sealing means for selectively maintaining the bag in a sealed configuration, and having a selectively releasable support means located adjacent a mouth of the bag to temporarily prop the bag-mouth in a maximal open position to simplify the placement of waste into the bag, wherein the improvement in said selectively releasable support means comprises:

a locking support structure attached to said flexible bag adjacent to said mouth, said support structure further comprising:

a hinged strip having a pair of linear lateral support arms, said hinged strip attached to a first interior surface of said flexible bag, and a linear center stay attached to an opposing, second interior surface of said flexible bag, said center stay being of such dimension and position so as to define spaces between the ends thereof and a pair of sidewalls of said flexible bag, said pair of linear lateral support arms selectively interengageable with said center stay at a support arm receiving surface at each lateral end thereof when said pair of linear lateral support arms extend at an angle less than normal from said first interior surface of slideably abut against said opposing, second interior surface at said spaces, whereby the pair of lateral support arms and the center stay cooperate to maintain the bag-mouth in a maximal open configuration and, thereafter, providing rapid collapsibility of the bag-mouth by releasing the lateral support arms from said center stay when said first and second interior surfaces are moved apart.

* * * * *